United States Patent [19]

Kirchmayr et al.

[11] Patent Number: 4,797,161

[45] Date of Patent: Jan. 10, 1989

[54] MIXTURE FOR MANUFACTURE OF SHAPED ELEMENTS AND ITS USE

[75] Inventors: Karl Kirchmayr, Vöcklabruck; Hans-Jürgen Miko, Altmünster; Bruno Watzka, Vöcklabruck, all of Austria; Josef Studinka, Zürich; Carl Schmitt-Henco, Wesen, both of Switzerland

[73] Assignee: Ametex AG, Niederurnen, Switzerland

[21] Appl. No.: 53,626

[22] Filed: May 26, 1987

[30] Foreign Application Priority Data

Jun. 2, 1986 [AT] Austria .................................. 1474/86
Oct. 13, 1986 [CH] Switzerland ......................... 4078/86

[51] Int. Cl.$^4$ .............................................. C04B 7/02
[52] U.S. Cl. ....................................... 106/98; 106/99; 106/163.1; 106/162; 106/204; 264/82; 264/333
[58] Field of Search .................. 106/97, 98, 99, 163.1, 106/162, 204; 264/333, 82

[56] References Cited

U.S. PATENT DOCUMENTS 2,698,251 12/1954 Shea et al. .............................. 106/98
4,501,830 2/1985 Miller et al. ........................... 106/98

Primary Examiner—Theodore Morris
Attorney, Agent, or Firm—Watson, Cole, Grindle & Watson

[57] ABSTRACT

The mixture for manufacture of shaped elements of fiber-cement, in addition to minimum 5% by weight of pozzuolanic silicic acid contains also an amount of limestone powder. With this mixture it is possible to obtain a product of high strength properties without tendency to embrittlement respectively to formation of cracks on the surface.

In utilizing the mixture for manufacture of shaped elements the latter are moulded from a mixture of aqueous material and permitted to set at 70° to 90° C. during 5 to 12 hours preferably with simultaneous compression.

10 Claims, No Drawings

MIXTURE FOR MANUFACTURE OF SHAPED ELEMENTS AND ITS USE

BACKGROUND OF THE INVENTION

1. Field of the Invention

The invention refers to a mixture for the manufacture of hydraulic setting fiber-containing shaped elements, especially according to the wet process, containing a calcareous respectively lime-releasing binder, fibers and/or fiber-type products—in particular cellulosic fibers—and highly reactive pozzuolanic silicic acid as well as, if required, usual fillers and/or additives, especially mixing auxiliaries, agents for improvement of rheology and/or structure.

2. Description of the Prior Art

In accordance with the well-known wet process such mixtures are dewatered on Hatschek equipment and moulded. It is generally known that the subsequent setting of cement can take place at room temperature or at increased temperatures, e.g., at 40° to 100° C., in which case the relative humidity of the air should exceed 85%. The hardening process following the setting of the hydraulic binder may take place at room temperature or under the hydrothermal conditions in the autoclave.

The powdered silicic acid employed in this process is a pozzuolanic product of especially fine particles obtained in large qunantities in silicon (Si) electro-metallurgy for example. In international usage this product is known as "condensed silica fume (CSF)" while in German the term "kondensierter Kieselsäurestaub or Kieselsäurerauch" is employed. Another similar material is diatomite.

Up until now the CSF has been employed in such mixtures in an amount of from 5 to 40% by weight in relation to the dry mixture. However, shaped elements made from such mixtures, while showing the desired strength properties, become brittle and tend to form cracks event at minimum exposure to effort, e.g. may occur with changes of humidity during drying prior to application of varnish to the surface. A further drawback is the reduction in productivity when working in accordance with the wet process because CSF exercises a negative influence on the dewatering behaviour of the mixture.

In the course of research work it was discovered that this tendency to embrittlement combined with formation of cracks in finished shaped products could be avoided by addition of highly reactive pozzuolanic silicic acid (CSF) a quantity of less than 5% by weight in relation to the dry mixture. On the other hand, unfortunately, with a mixture of this type it is, as a result, not possible to obtain sufficiently satisfactory strength values, so that this positive result in general does not offer a solution to the problem.

SUMMARY OF THE INVENTION

Now, however, it was surprisingly found that the above-mentioned tendency to embrittlement and formation of cracks in finished shaped elements, and the diminished workability properties of the material mixtures of this type, can be avoided or at least substantially improved, while the favorable strength values retained, if limestone powder is added to the mixture containing the usual amounts of CSF.

Accordingly, the mixtures in conformity with the invention, include pozzuolanic silicic acid in amounts of at least 5% by weight in relation to the dry mixture, as well as an additional content of limestone powder.

Limestone powder is a filler well known in the cement industry; totally surprising, however, is its effect of counteracting the embrittlement caused by the admixture of CSF. Other known fillers such as quartz powder do not show this same property.

Likewise, the invention involves the utilization of a mixture according to the invention for the manufacture of cement-based shaped elements, especially sheets such as corrugated sheets, whereby in accordance with the invention, the shaped elements are moulded from the aqueous material mixture, and the mixture is caused to set at a temperature ranging from 70° to 90° C. for 5 to 12 hours.

Preferably the shaped elements exposed to the influence of heat are simultaneously subjected to compression such pressing possibly taking place in a heating kiln prior to the hydraulic setting.

Shaped elements, individually or piled up in stacks, may for instance be placed between heated moulds where they can also be subjected to compressing.

DESCRIPTION OF THE PREFERRED EMBODIMENTS

In the following the invention will be explained in a more detailed manner on the basis of trials. For purposes of carrying out the trials sample sheets were produced on Hatschek equipment. The sheets were compressed and placed in storage for 8 to 24 hours at a temperature of 70° to 90° C. and relative humidity of the air of no less than 85%. Testing for flexural strength took place after 28 days and storage in water for 24 to 48 hours, the samples being in wet condition. During exposure to load in an "Instron 1125" testing machine, a load deformation diagram was automatically recorded. Load speed was set at 20 mm/min. E modulus of the samples were calculated on the basis of the data from the load deformation diagram. Determination of specific weight and water absorption was carried out according to Austrian standardization procedures OeNORM B 3522.

For the determination of the tendency to cracking of the sheets, the sample plates were alternatively subjected to storage in water and in air, both at 70° C. Duration of water curing was 3 days and for air curing 4 days. After each cycle the testing samples were examined for cracks by visual inspection.

In carrying out the trials the following raw materials were employed:

(a) Portland cement D 275 H, Blaine count 3000 cm$^2$/g, (b) limestone powder ($CaCO_3$ content >95%), Blaine 3500 cm$^2$/g, (c) CSF commercial product Fesilur 75 (SKW Trostberg), specific surface about 20 m$^2$/g.($SiO_2$ content >83%)

(d) sulphate cellulose refined to 20°–40° SR. Results obtained are compiled in Table 1.

As may be seen, flexural strength increases with the addition of CSF, a fact previously known. At the same time, however, the sensitivity to cracking increases. It came as a surprise that the addition of CSF in small doses diminishes the sensitivity to cracking. Quite possibly this points to the existence of an interaction with the fibers of the mixture, thus improving the bond between fibers and matrix, whereby, however, the amount of CFS is not sufficient to cause embrittlement of the matrix. Moreover, flexural strength obtainable is not sufficient.

Still more surprising is the fact that limestone powder can neutralize the tendency to embrittlement of the matrix caused by the high content of CSF. In this phenomena a dilution effect could be presumed, whereby in spite of the low cement content caused thereby, the flexural strength of the sheets remains approximately the same.

With a CSF content exceeding 5% by weight, limestone powder is added in accordance with the invention, preferably 5 to 38% by weight, more particularly 10 to 25% by weight.

When employing limestone powder it is possible to vary the amount of CSF content in a broad range; preferably this may amount to 5 to 40% by weight, particularly to 6 to 10% by weight.

In accordance with the invention the procedure is to use the mixture of aqueous material for moulding shaped elements which subsequently are undergoing the setting process at a temperature of 70°-90° C. for 5 to 12 hours.

Surprisingly it was found that shaped elements can be obtained with essentially improved structure and improved mechanical properties in relation to the present state of the art, provided the "green" shaped elements, during and/or after being moulded, are at the same time subjected to the effects of mechanical compression and heat treatment, i.e. simultaneous compression and heating.

The basis of this lies on the one hand in the mixture according to the invention, and on the other hand on the sequence of the procedure. Even without steam-curing the shaped elements after a few hours already attain 90–95% of their final strength properties, so that

TABLE 1

| Mixture nr. | 1 | 2 | 3 | 4 | 5 | 6 | 7 | 8 | 9 | 10 | 11 | 12 | 13 |
|---|---|---|---|---|---|---|---|---|---|---|---|---|---|
| Portland cement | 93 | 85 | 78 | 72 | 92,3 | 88,2 | 84,5 | 77,9 | 76,9 | 68,9 | 69,3 | 61,5 | 56,0 |
| Cellulose | 7 | 6,5 | 6,3 | 6,2 | 7,7 | 7,4 | 7,0 | 6,5 | 7,7 | 7,7 | 7,7 | 7,7 | 7,7 |
| CSF | 0 | 8,5 | 15,7 | 21,8 | 0 | 4,4 | 8,5 | 15,6 | 15,4 | 8,0 | 13,8 | 12,3 | 10,0 |
| Limestone powder | | | | | | 0 | | | 0 | 15,4 | 9,2 | 18,5 | 26,3 |
| Flexural strength N/mm$^2$ | 17,7 | 23,6 | 34,1 | 32,8 | 20,5 | 23,7 | 26,4 | 29,5 | 25,6 | 26,0 | 27,4 | 26,1 | 27,4 |
| E modulus kN/mm$^2$ | 18,0 | 15,0 | 14,6 | 16,3 | 13,8 | 16,0 | 18,4 | 20,3 | 18,1 | 19,1 | 18,7 | 15,7 | 22,8 |
| Specific weight kg/l | 1,66 | 1,65 | 1,62 | 1,56 | 1,74 | 1,74 | 1,75 | 1,77 | 1,71 | 1,68 | 1,70 | 1,70 | 1,66 |
| Water absorption | 10,0 | 16,4 | 18,0 | 17,7 | 17,8 | 18,8 | 18,5 | 18,0 | 20,2 | 21,2 | 20,2 | 20,6 | 22,1 |
| Number of cycles endured without cracks | 4 | 6 | 3 | 3 | 5 | * | 7 | 4 | 3 | * | * | * | * |

*free of cracks even after 10 cycles

Similarly, the content of hydraulic binders in the mixture according to the invention can be varied within ample limits, always taking into account the purpose of the utilization of the mixture and its other components. It may amount to 20 to 85% by weight, and will range preferably between 30 and 70% by weight, in particular between 45 and 70% by weight.

The fiber content of the mixture according to the invention amounts to 5 to 20% by weight; there should be a minimum of 5% by weight, especially 5 to 15% by weight of cellulosic fibers. As has been shown, low amounts of CSF, especially in combination with cellulosic fibers, will produce favourable results.

A particularly favourable mixture according to the invention for manufacture of shaped fiber cement elements contains 5–10% by weight of pozzuolanic amorphous silicic acid, 10–35% by weight lime-stone powder, 50–70% by weight cement, and 5–12% by weight cellulose (cellulosic fibers).

Based on such a mixture, shaped elements of high strength properties and impeccable surface can be obtained without the necessity for an expensive treatment by steam curing (autoclaving) for purposes of hydraylic setting.

All percentages indicated refer to the dry mixture.

As usual, additives such as mixing auxiliaries as well as improving agents for rheology and structure have already been mentined may be included. Hydraulic setting accelerators and floculation agents, as well as other additives such as woolastonite, clays, mica, vermiculite, diatomite (Kieselguhr), perlite, fly ash and similar materials, can also be used.

According to the invention the afore-mentioned mixtures, are utilized for manufacture of shaped elements, especially sheets such as for instance corrugated sheets made of fiber cement.

in comparison with the state of the art considerably better transport and storage conditions can be achieved.

Advantageously the procedure can provide for heat application to the shaped elements via compression and moulding installations, more especially via preheated compression tools, preferably arranged in a circulatory system whereby it will be advantageous to provide a heat insulating installation for the pressing tools along a part of the circuit for reduction of any heat transmission losses not related to shaped elements.

The procedure in accordance with the invention will be explained in more detail on basis of an example:

A mixture consisting of Portland cement, silicic acid, dust, limestone powder, cellulosic fibers and water was worked on a Hatschek machine into a fleece for sheets which was withdrawn from the machine at a temperature of about 23° C. and by means of compression templates, preheated to 90° C. approx., integrated into a mixed stack in known manner. Thereafter, this mixed stack was subjected to compression for about 40 min., then wrapped in heat-insulating material and let rest for about 8 hours. At the subsequent dissolution of the stack, both the moulded sheets and the compression templates showed a temperature of 60° C. At this point the moulded sheets already exceeded 90% of their final strength values and were transferred to stocks. During the following cleaning of the compression moulds, their temperature dropped to 40° C., whereupon they were preheated to about 90° C. and reintegrated into the mixed stack formation process. Excellent strength values were obtained in the moulded sheets as well as a largely reduced water absorption and outsanding long-term weathering stability.

Furthermore, the process described offers advantages in energy consumption inasmuch as by immediate reintegration of the compressing templates after a short reaction time only the inherent heat originating in cement hydration will not be lost and only a small difference in temperature must be compensated by reheating the pressing templates. Furthermore it is possible to preheat also templates on which material to be compressed has been placed already.

Compressing tools, or parts thereof, which are to transmit heat to the shaped elements, may be preheated in different ways. Electrical induction heating has been found to be especially advantageous when using compressing templates, whereby such heat treatment is preferably applied to one side of the templates only. This procedure is especially suitable for preheating compressing templates already covered with the pre-moulded product made from fresh fiber-cement.

We claim:

1. A mixture for use in the manufacture of hydraulically-setting, fiber-containing shaped elements, said mixture containing, based on the total weight of the mixture when dry, 5 to 20% by weight fibers, 20 to 85% by weight hydraulic binder, 5 to 40% by weight pozzuolanic silicic acid, and 5 to 35% by weight limestone.

2. A mixture according to claim 1, wherein said mixture includes cellulosic fibers.

3. A mixture according to claim 2, wherein said mixture contains 5 to 15% by weight cellulosic fibers.

4. A mixture according to claim 1, wherein said mixture contains 10 to 30% by weight fibers.

5. A mixture according to claim 1, wherein said mixture contains 5 to 10% by weight pozzuolanic silicic acid.

6. A mixture according to claim 1, wherein said mixture contains 30 to 70% by weight hydraulic binder.

7. A mixture according to claim 1, including additional agents selected from flocculation agents, setting accelerators and workability-improving agents.

8. A mixture according to claim 1, wherein said limestone contains at least 95% by weight calcium carbonate.

9. A method of manufacturing fiber-containing shaped elements comprising the steps of
    (1) providing a mixture containing, based on the total weight of the mixture when dry, 5 to 20% by weight fibers, 20 to 85% by weight hydraulic cement, 5 to 40% by weight pozzuolanic silicic acid, and 5 to 35% by weight of limestone,
    (2) adding water to said mixture to form an aqueous material mixture,
    (3) moulding said aqueous material mixture to form a shaped element, and
    (4) exposing said shaped element to a temperature of 70° to 90° C. for 5 to 12 hours to cause the aqueous material mixture of said shaped element to set.

10. A method according to claim 9, wherein during step (4) said shaped element is also compressed.

* * * * *